*(12)* United States Patent
Kato et al.

(10) Patent No.: US 8,228,252 B2
(45) Date of Patent: Jul. 24, 2012

(54) DATA COUPLER

(75) Inventors: Noboru Kato, Moriyama (JP); Ikuhei Kimura, Nara (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 260 days.

(21) Appl. No.: 12/252,475

(22) Filed: Oct. 16, 2008

(65) Prior Publication Data

US 2009/0034595 A1    Feb. 5, 2009

Related U.S. Application Data

(63) Continuation of application No. PCT/JP2007/060404, filed on May 22, 2007.

(30) Foreign Application Priority Data

May 26, 2006  (JP) ................................. 2006-146677
Sep. 12, 2006  (JP) ................................. 2006-247268

(51) Int. Cl.
*H01Q 9/00* (2006.01)
(52) U.S. Cl. ...................................................... 343/745
(58) Field of Classification Search .................. 343/745, 343/895, 702, 787–788; 375/257; 340/310
See application file for complete search history.

(56) References Cited

U.S. PATENT DOCUMENTS

| | | | |
|---|---|---|---|
| 2,203,487 A * | 6/1940 | Burgholz | ....................... 455/285 |
| 3,364,564 A | 1/1968 | Kurtz et al. | |
| 4,794,397 A | 12/1988 | Ohe et al. | |
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,757,074 A | 5/1998 | Matloubian et al. | |
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |
| 6,034,651 A * | 3/2000 | Enguent | ........................ 343/895 |
| 6,104,311 A | 8/2000 | Lastinger | |

(Continued)

FOREIGN PATENT DOCUMENTS

DE    2005007632    *  5/2005

(Continued)

OTHER PUBLICATIONS

Official Communication issued in International Patent Application No. PCT/JP2007/060404, mailed on Aug. 28, 2007.

(Continued)

*Primary Examiner* — Huedong Mancuso
(74) *Attorney, Agent, or Firm* — Keating & Bennett, LLP

(57) ABSTRACT

A data coupler includes an antenna substrate that is not electrically connected in a DC arrangement to an electric power line, is arranged adjacent to the electric power line, and is connected to a modem. A resonant circuit including an inductance element and a capacitance element is provided in the antenna substrate. In the resonant circuit, the inductance element is magnetically coupled to the electric power line. The resonant circuit transmits a radio-frequency signal superimposed on the electric power line to the modem. The resonant circuit also transmits a transmission signal from the modem to the electric power line.

5 Claims, 4 Drawing Sheets

U.S. PATENT DOCUMENTS

| | | |
|---|---|---|
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,828,881 B2 | 12/2004 | Mizutani et al. |
| 6,927,738 B2 | 8/2005 | Senba et al. |
| 6,963,729 B2 | 11/2005 | Uozumi |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,339,466 B2 * | 3/2008 | Mansfield et al. ............ 340/538 |
| 7,380,150 B2 * | 5/2008 | Meier et al. .................... 713/340 |
| 7,405,664 B2 | 7/2008 | Sakama et al. |
| 7,656,904 B2 * | 2/2010 | Binder ........................ 370/493 |
| 2002/0011967 A1 | 1/2002 | Goff et al. |
| 2002/0044092 A1 | 4/2002 | Kushihi |
| 2002/0067316 A1 | 6/2002 | Yokoshima et al. |
| 2004/0001027 A1 | 1/2004 | Killen et al. |
| 2004/0037363 A1 * | 2/2004 | Norsworthy et al. ......... 375/259 |
| 2004/0066195 A1 * | 4/2004 | Reykowski .................. 324/319 |
| 2004/0189263 A1 * | 9/2004 | Meier et al. .................... 323/210 |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0140512 A1 | 6/2005 | Sakama et al. |
| 2005/0232412 A1 | 10/2005 | Ichihara et al. |
| 2005/0236623 A1 | 10/2005 | Takechi et al. |
| 2005/0275539 A1 | 12/2005 | Sakama et al. |
| 2006/0001138 A1 | 1/2006 | Sakama et al. |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0132299 A1 * | 6/2006 | Mansfield et al. ............ 340/538 |
| 2006/0158380 A1 | 7/2006 | Son et al. |
| 2006/0267138 A1 | 11/2006 | Kobayashi |
| 2007/0004028 A1 | 1/2007 | Lair et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0236336 A1 * | 10/2007 | Borcherding ............. 340/10.34 |
| 2007/0252700 A1 | 11/2007 | Ishihara et al. |
| 2007/0285335 A1 | 12/2007 | Bungo et al. |
| 2008/0001572 A9 * | 1/2008 | Baarman et al. ............. 320/108 |
| 2008/0024156 A1 | 1/2008 | Arai et al. |
| 2008/0169905 A1 | 7/2008 | Slatter |
| 2008/0272885 A1 | 11/2008 | Atherton |
| 2009/0002130 A1 | 1/2009 | Kato |

FOREIGN PATENT DOCUMENTS

| | | | |
|---|---|---|---|
| DE | 20 2005 007 632 U1 | 9/2005 | |
| EP | 0 977 145 A2 | 2/2000 | |
| JP | 50-143451 A | 11/1975 | |
| JP | 62-127140 U | 8/1987 | |
| JP | 05-327331 A | 12/1993 | |
| JP | 6-53733 A | 2/1994 | |
| JP | 06-077729 A | 3/1994 | |
| JP | 06-177635 A | 6/1994 | |
| JP | 07-183836 A | 7/1995 | |
| JP | 08-056113 A | 2/1996 | |
| JP | 8-87580 A | 4/1996 | |
| JP | 11-149537 A | 6/1996 | |
| JP | 08-279027 A | 10/1996 | |
| JP | 08-307126 A | 11/1996 | |
| JP | 08-330372 A | 12/1996 | |
| JP | 09-014150 A | 1/1997 | |
| JP | 09-245381 A | 9/1997 | |
| JP | 09-252217 A | 9/1997 | |
| JP | 09-270623 A | 10/1997 | |
| JP | 10-505466 A | 5/1998 | |
| JP | 10-171954 A | 6/1998 | |
| JP | 10-293828 A | 11/1998 | |
| JP | 11-149538 A | 6/1999 | |
| JP | 11-219420 A | 8/1999 | |
| JP | 11-328352 A | 11/1999 | |
| JP | 11-346114 A | 12/1999 | |
| JP | 11-515094 A | 12/1999 | |
| JP | 2000-21128 A | 1/2000 | |
| JP | 2000-021639 A | 1/2000 | |
| JP | 2000-022421 A | 1/2000 | |
| JP | 2005-229474 A | 1/2000 | |
| JP | 2000-059260 A | 2/2000 | |
| JP | 2000-085283 A | 3/2000 | |
| JP | 2000-132643 A | 5/2000 | |
| JP | 2000-137778 A | 5/2000 | |
| JP | 2000-148948 A | 5/2000 | |
| JP | 2000-172812 A | 6/2000 | |
| JP | 2000-510271 A | 8/2000 | |
| JP | 2000-276569 A | 10/2000 | |
| JP | 2000-286634 A | 10/2000 | |
| JP | 2000-286760 A | 10/2000 | |
| JP | 2000-311226 A | 11/2000 | |
| JP | 2000-321984 A | 11/2000 | |
| JP | 2001-028036 A | 1/2001 | |
| JP | 2007-18067 A | 1/2001 | |
| JP | 2001-66990 A | 3/2001 | |
| JP | 2001-168628 A | 6/2001 | |
| JP | 2001-256457 A | 9/2001 | |
| JP | 2001-514777 A | 9/2001 | |
| JP | 2001-319380 A | 11/2001 | |
| JP | 2001-331976 A | 11/2001 | |
| JP | 2001-332923 A | 11/2001 | |
| JP | 2001-344574 A | 12/2001 | |
| JP | 2001-351084 A | 12/2001 | |
| JP | 2002-024776 A | 1/2002 | |
| JP | 2002-042076 A | 2/2002 | |
| JP | 2002-505645 A | 2/2002 | |
| JP | 2002-76750 A | 3/2002 | |
| JP | 2002-150245 A | 5/2002 | |
| JP | 2002-175508 A | 6/2002 | |
| JP | 2002-183690 A | 6/2002 | |
| JP | 2002-185358 A | 6/2002 | |
| JP | 2002-204117 A | 7/2002 | |
| JP | 2002-230128 A | 8/2002 | |
| JP | 2002-298109 A | 10/2002 | |
| JP | 2002-319008 A | 10/2002 | |
| JP | 2002-362613 A | 12/2002 | |
| JP | 2002-373029 A | 12/2002 | |
| JP | 2002-373323 A | 12/2002 | |
| JP | 2003-016412 A | 1/2003 | |
| JP | 2003-030612 A | 1/2003 | |
| JP | 2003-44789 A | 2/2003 | |
| JP | 2003-58840 A | 2/2003 | |
| JP | 2003-067711 A | 3/2003 | |
| JP | 2003-076947 A | 3/2003 | |
| JP | 2003-085501 A | 3/2003 | |
| JP | 2003-085520 A | 3/2003 | |
| JP | 2003-87008 A | 3/2003 | |
| JP | 2003-87044 A | 3/2003 | |
| JP | 2003-099720 A | 4/2003 | |
| JP | 2003-099721 A | 4/2003 | |
| JP | 2003-110344 A | 4/2003 | |
| JP | 2003-132330 A | 5/2003 | |
| JP | 2003-134007 A | 5/2003 | |
| JP | 2003-155062 A | 5/2003 | |

| | | | |
|---|---|---|---|
| JP | 2003-158414 A | 5/2003 | |
| JP | 2003-187207 A | 7/2003 | |
| JP | 2003-187211 A | 7/2003 | |
| JP | 2003-198230 A | 7/2003 | |
| JP | 2003-209421 A | 7/2003 | |
| JP | 2003-218624 A | 7/2003 | |
| JP | 2003-233780 A | 8/2003 | |
| JP | 2003-242471 A | 8/2003 | |
| JP | 2003-243918 A | 8/2003 | |
| JP | 2003-288560 A | 10/2003 | |
| JP | 2003-309418 A | 10/2003 | |
| JP | 2003-332820 A | 11/2003 | |
| JP | 2004-88218 A | 3/2004 | |
| JP | 2004-096566 A | 3/2004 | |
| JP | 2004-253858 A | 9/2004 | |
| JP | 2004-287767 A | 10/2004 | |
| JP | 2004-297249 A | 10/2004 | |
| JP | 2004-326380 A | 11/2004 | |
| JP | 2004-334268 A | 11/2004 | |
| JP | 2004-336250 A | 11/2004 | |
| JP | 2004-343000 A | 12/2004 | |
| JP | 2004-362190 A | 12/2004 | |
| JP | 2004-362341 A | 12/2004 | |
| JP | 2004-362602 A | 12/2004 | |
| JP | 2005-136528 A | 5/2005 | |
| JP | 2005-165839 A | 6/2005 | |
| JP | 2005-167327 A | 6/2005 | |
| JP | 2005-191705 A | 7/2005 | |
| JP | 2005-210676 A | 8/2005 | |
| JP | 2005-210680 A | 8/2005 | |
| JP | 2005-217822 A | 8/2005 | |
| JP | 2005-236339 A | 9/2005 | |
| JP | 2005-244778 A | 9/2005 | |
| JP | 2005-275870 A | 10/2005 | |
| JP | 2005-295135 A | 10/2005 | |
| JP | 2005-311205 A | 11/2005 | |
| JP | 2005-321305 A | 11/2005 | |
| JP | 2005-335755 A | 12/2005 | |
| JP | 2005-346820 A | 12/2005 | |
| JP | 2005-352858 A | 12/2005 | |
| JP | 2006-031766 A | 2/2006 | |
| JP | 2006-39902 A | 2/2006 | |
| JP | 2006-67479 A | 3/2006 | |
| JP | 2006-72706 A | 3/2006 | |
| JP | 2006-80367 A | 3/2006 | |
| JP | 2006-92630 A | 4/2006 | |
| JP | 2006-102953 A | 4/2006 | |
| JP | 2006-148518 A | 6/2006 | |
| JP | 2006-195795 A | 7/2006 | |
| JP | 2006-270212 A | 10/2006 | |
| JP | 2006-309401 A | 11/2006 | |
| JP | 2007-65822 A | 3/2007 | |
| JP | 2007-150868 A | 6/2007 | |
| JP | 11-175678 A | 1/2009 | |
| NL | 9100176 A | 3/1992 | |
| NL | 9100347 A | 3/1992 | |
| WO | 03/079305 A1 | 9/2003 | |
| WO | 2004/036772 A1 | 4/2004 | |
| WO | 2004/036772 A2 | 4/2004 | |
| WO | 2004/070879 A | 8/2004 | |
| WO | 2004/072892 A1 | 8/2004 | |
| WO | 2005/073937 A | 8/2005 | |
| WO | 2005/115849 A1 | 12/2005 | |
| WO | 2006/045682 A | 5/2006 | |

OTHER PUBLICATIONS

English translation of NL9100176, published on Mar. 2, 1992.
English translation of NL9100347, published on Mar. 2, 1992.
Kato et al.: "Antenna," U.S. Appl. No. 11/928,502, filed Oct. 30, 2007.
Kato et al.: Wireless IC Device, U.S. Appl. No. 12/211,117, filed Sep. 16, 2008.
Kato et al.: "Antenna," U.S. Appl. No. 11/688,290, filed Mar. 20, 2007.
Kato et al.: "Electromagnetic-Coupling-Module-Attached Article," U.S. Appl. No. 11/740,509, filed Apr. 26, 2007.
Kato et al.: "Product Including Power Supply Circuit Board," U.S. Appl. No. 12/234,949, filed Sep. 22, 2008.
Dokai et al.: "Wireless IC Device and Component for Wireless IC Device," U.S. Appl. No. 12/359,690, filed Jan. 26, 2009.
Kato et al.; "Information Terminal Device," U.S. Appl. No. 12/267,666, filed Nov. 10, 2008.
Kato et al.: "Wireless IC Device and Wireless IC Device Composite Component," U.S. Appl. No. 12/276,444, filed Nov. 24, 2008.
Dokai et al.: "Optical Disc," U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System," U.S. Appl. No. 12/274,400, filed Nov. 20, 2008.
Kato: "Wireless IC Device," U.S. Appl. No. 11/964,185, filed Dec. 26, 2007.
Kato et al.: "Radio Frequency IC Device," U.S. Appl. No. 12/336,629, filed Dec. 17, 2008.
Kato et al.: "Wireless IC Device and Component for Wireless IC Device," U.S. Appl. No. 12/339,198, filed Dec. 19, 2008.
Ikemoto et al.: "Wireless IC Device," U.S. Appl. No. 11/851,651, filed Sep. 7, 2007.
Kataya et al.: "Wireless IC Device and Electronic Device," U.S. Appl. No. 11/851,661, filed Sep. 7, 2007.
Dokai et al.: "Antenna and Radio IC Device," U.S. Appl. No. 12/350,307, filed Jan. 8, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen Ic Tagu Katsuyo-no Subete" "(All About Wireless Ic Tags")", RFID, pp. 112-126.
Dokai et al.: "Wireless IC Device and Component for Wireless IC Device," U.S. Appl. No. 11/624,382, filed Jan. 18, 2007.
Dokai et al.: "Wireless IC Device, and Component for Wireless IC Device," U.S. Appl. No. 11/930,818, filed Oct. 31, 2007.
Kato et al.: "Wireless IC Device," U.S. Appl. No. 12/042,399, filed Mar. 5, 2008.
Official communication issued in related U.S. Appl. No. 12/042,399; mailed on Aug. 25, 2008.
Official Communication issued in corresponding German Patent Application No. 11 2007 001 222.6, mailed on May 4, 2010.
English language translation of an Official Communication issued in corresponding German Patent Application No. 11 2007 001 222.6, mailed on May 4, 2010.
Official Communication issued in corresponding Chinese Patent Application No. 200780019032.4, mailed on Nov. 9, 2011.

* cited by examiner

DATA COUPLER

BACKGROUND OF THE INVENTION

1. Field of the Invention

The present invention relates to a data coupler, and more particularly, to a data coupler to perform communication using an electric power line.

2. Description of the Related Art

Various data couplers to couple data between an electric power line and a communication device, such as a modem, have been used as data communication systems using electric power lines. For example, a data coupler including an inductive coupler that includes an electric power line conductor as a primary winding, a capacitor connected across a secondary winding of the inductive coupler to create a resonant circuit with the secondary winding at a frequency within a desired frequency band, and an impedance matching transformer to connect a communication device to the secondary winding is disclosed in Japanese Unexamined Patent Application Publication (Translation of PCT Application) No. 2006-503504.

In the data coupler, a parallel resonant circuit is defined by providing a transformer on an electric power line and inserting a capacitor on a side of the transformer near a secondary winding, and the resonant frequency of the parallel resonant circuit is set to substantially the same frequency as the frequency of a radio-frequency signal used for data exchange. Accordingly, a radio-frequency signal to be used for data exchange is acquired and transmitted to a modem or other suitable component that performs data processing.

However, since an alternating current of about 100 V from an electric power line must flow in this type of data coupler, use of a copper wire that withstands high power is required. Thus, there is a problem in that the size of the coupler itself must be increased. In addition, since a data coupler must be directly connected to an electric power line, there is another problem in that it is difficult to install the data coupler onto the electric power line.

SUMMARY OF THE INVENTION

To overcome the problems described above, preferred embodiments of the present invention provide a small-size data coupler to be used in a data communication system and including an electric power line that can be easily installed.

According to a preferred embodiment of the present invention, a data coupler arranged to couple data between an electric power line and a communication device includes an antenna that is not electrically connected in a DC arrangement to the electric power line. The antenna is arranged adjacent to the electric power line.

By arranging the antenna adjacent to the electric power line without electrically connecting the antenna to the electric power line in a DC arrangement, a radio-frequency signal that is superimposed on the electric power line is supplied to the communication device and a radio-frequency signal from the communication device is supplied to the electric power line. Since only a radio-frequency signal is exchanged without causing the antenna to be electrically connected in a DC arrangement to the electric power line, the data coupler is not required to withstand high voltages and the size thereof can be reduced. In addition, since the antenna is arranged along the electric power line, installation of the antenna can be easily performed.

The antenna may preferably include a resonant circuit including an inductor pattern and a capacitor pattern. In addition, the antenna may preferably include at least two resonant circuits. The frequency of a radio frequency exchanged between the electric power line and the communication device is determined based on the resonant frequency of the resonant circuit. When the antenna includes two or more resonant circuits, the frequency band of a transmission signal can be increased by coupling of the resonant circuits.

The antenna may preferably be arranged adjacent to the electric power line with only an insulator film of the electric power line therebetween. Alternatively, the antenna may be arranged adjacent to a metal wire that is wound around the electric power line. In this case, the antenna may be arranged adjacent to one end of the metal wire. Alternatively, the antenna may be arranged adjacent to the metal wire that is wound around the electric power line such that winding directions on a hot side and a cold side of the electric power line are opposite to each other. When the antenna is arranged adjacent to the metal wire that is wound around the electric power line such that the winding directions on the hot side and the cold side of the electric power line are opposite to each other, due to a differential operation of the metal wire, electromagnetic waves are not emitted from the metal wire. Thus, transmission of energy can be efficiently performed.

A modem having a data processing function can be suitably used as the communication device.

According to preferred embodiments of the present invention, since only a radio-frequency signal is exchanged without causing an antenna to be electrically connected in a DC arrangement to an electric power line, the data coupler is not required to withstand high voltages and the size thereof can be reduced. In addition, since the antenna is simply arranged along the electric power line or the antenna is simply arranged adjacent to a metal wire that is wound around the electric power line, installation of the antenna can be easily performed.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
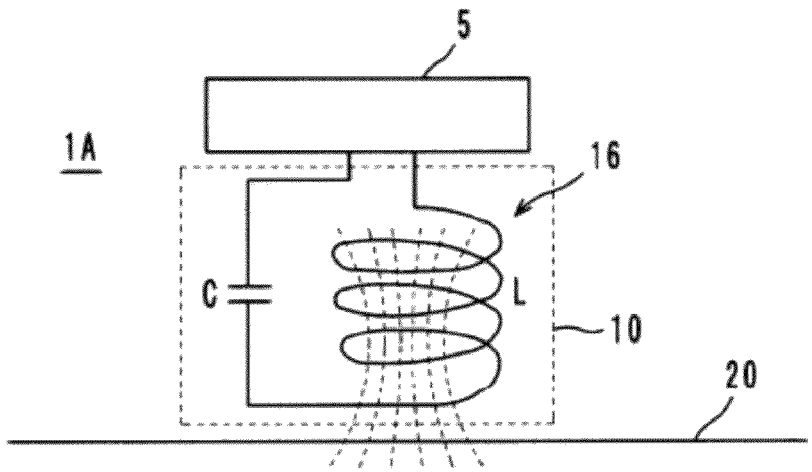
FIG. 1 is an equivalent circuit diagram showing a data coupler according to a first preferred embodiment of the present invention.

Data couplers according to preferred embodiments of the present invention will be described with reference to the attached drawings. In the preferred embodiments described below, common components and portions in the preferred embodiments are represented by the same reference numerals and explanations of those common components and portions will not be repeated.

First Preferred Embodiment

A data coupler 1A according to a first preferred embodiment includes an equivalent circuit shown in FIG. 1. In the data coupler 1A, a resonant circuit 16 is included in an antenna substrate 10. The antenna substrate 10 is arranged adjacent to a commercial electric power line 20 such that the antenna substrate 10 is not electrically connected in a DC arrangement to the electric power line 20. In addition, a modem 5, which is a communication device having a data processing function, is connected to the antenna substrate 10.

The resonant circuit 16 is an LC series resonant circuit including an inductance element L and a capacitance element C. The winding axis of a coil-shaped electrode pattern, which defines the inductance element L, is substantially perpendicular to the electric power line 20. The resonant circuit 16 is primarily magnetically coupled to the electric power line 20.

The resonant circuit 16 is a circuit arranged to supply a transmission signal having a specific frequency to the electric power line 20 and to select a reception signal having the specific frequency from a radio-frequency signal superimposed on the electric power line 20 and supply the reception signal to the modem 5. The resonant circuit 16 resonates at the frequency of the transmission and reception signals.

Figure 2:
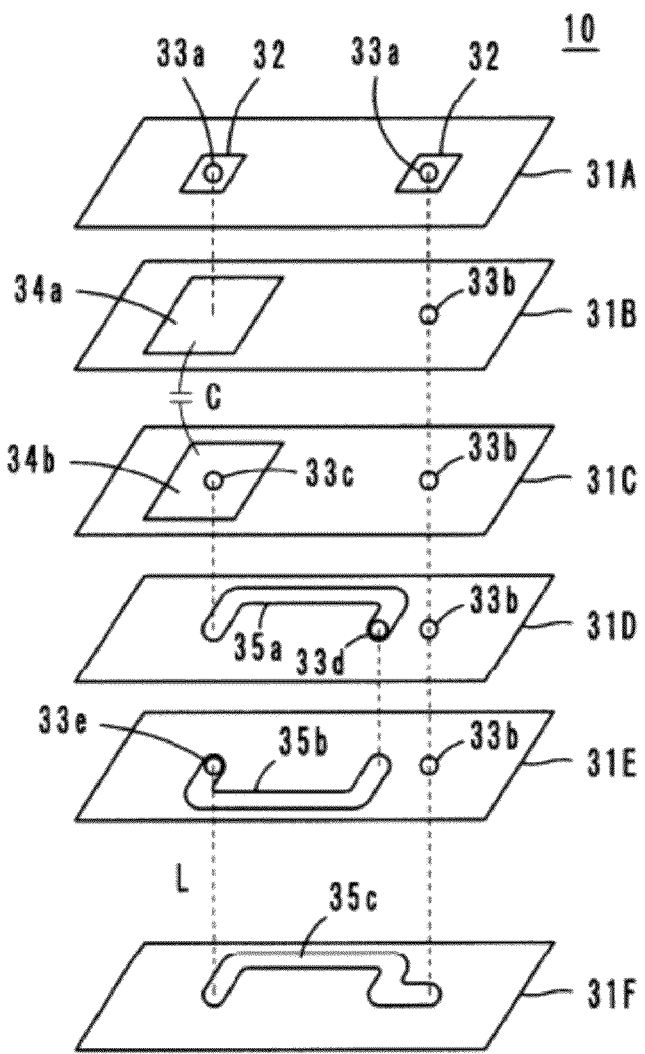
FIG. 2 is an exploded perspective view showing an antenna substrate according to the first preferred embodiment of the present invention.

More specifically, as shown in an exploded perspective view in FIG. 2, the antenna substrate 10 is preferably a laminated body formed by laminating, pressure-bonding, and firing dielectric ceramic sheets 31A to 31F together. The antenna substrate 10 preferably includes the sheet 31A on which connecting electrodes 32 and via-hole conductors 33$a$ are formed, the sheet 31B on which a capacitor electrode 34$a$ and a via-hole conductor 33$b$ are formed, the sheet 31C on which a capacitor electrode 34$b$ and via-hole conductors 33$c$ and 33$b$ are formed, the sheet 31D (one or more sheets) on which a conductor pattern 35$a$ and via-hole conductors 33$d$ and 33$b$ are formed; the sheet 31E (one or more sheets) on which a conductor pattern 35$b$ and via-hole conductors 33$e$ and 33$b$ are formed; and the sheet 31F on which a conductor pattern 35$c$ is formed.

By laminating the sheets 31A to 31F together, the LC series resonant circuit including the inductance element L having a helical winding axis that is substantially perpendicular to the electric power line 20 and the capacitance element C connected in series to the inductance element L are obtained. Preferably, the capacitor electrode 34$a$ is connected, via the via-hole conductor 33$a$, to the connecting electrode 32 and is also connected to the modem 5. One end of the inductance element L is connected, via the via-hole conductor 33$b$, to the connecting electrode 32 and is also connected to the modem 5.

The data coupler 1A receives a radio-frequency signal (preferably, for example, in a frequency band from about 2 MHz to about 30 MHz or a UHF frequency band), which is superimposed on the electric power line 20, from the electric power line 20, and causes the resonant circuit 16 (the LC series resonant circuit including the inductance element L and the capacitance element C), which is primarily magnetically coupled to the electric power line 20, to resonate, and supplies a reception signal only in a specific frequency band to the modem 5. An output signal from an information device, such as a personal computer (not shown) is input to the resonant circuit 16 via the modem 5. The resonant circuit 16 performs reflection modulation of the output signal to match the frequency of the output signal to a specific frequency. Then, a transmission signal is transmitted from the inductance element L, through magnetic coupling, to the electric power line 20.

In the first preferred embodiment, the antenna substrate 10 is not electrically connected in a DC arrangement to the electric power line 20, and only a radio-frequency signal is exchanged. Thus, the data coupler is not required to withstand high voltages and the size thereof can be reduced. In addition, since the antenna substrate 10 is simply arranged along the electric power line 20, installation of the antenna substrate 10 can be easily performed. In particular, since the winding axis of the coil-shaped electrode pattern is arranged substantially perpendicular to the electric power line 20, a magnetic flux component with respect to the electric power line 20 increases. Thus, the transmission efficiency of signal energy increases, thereby achieving a large gain.

Second Preferred Embodiment

Figure 3:
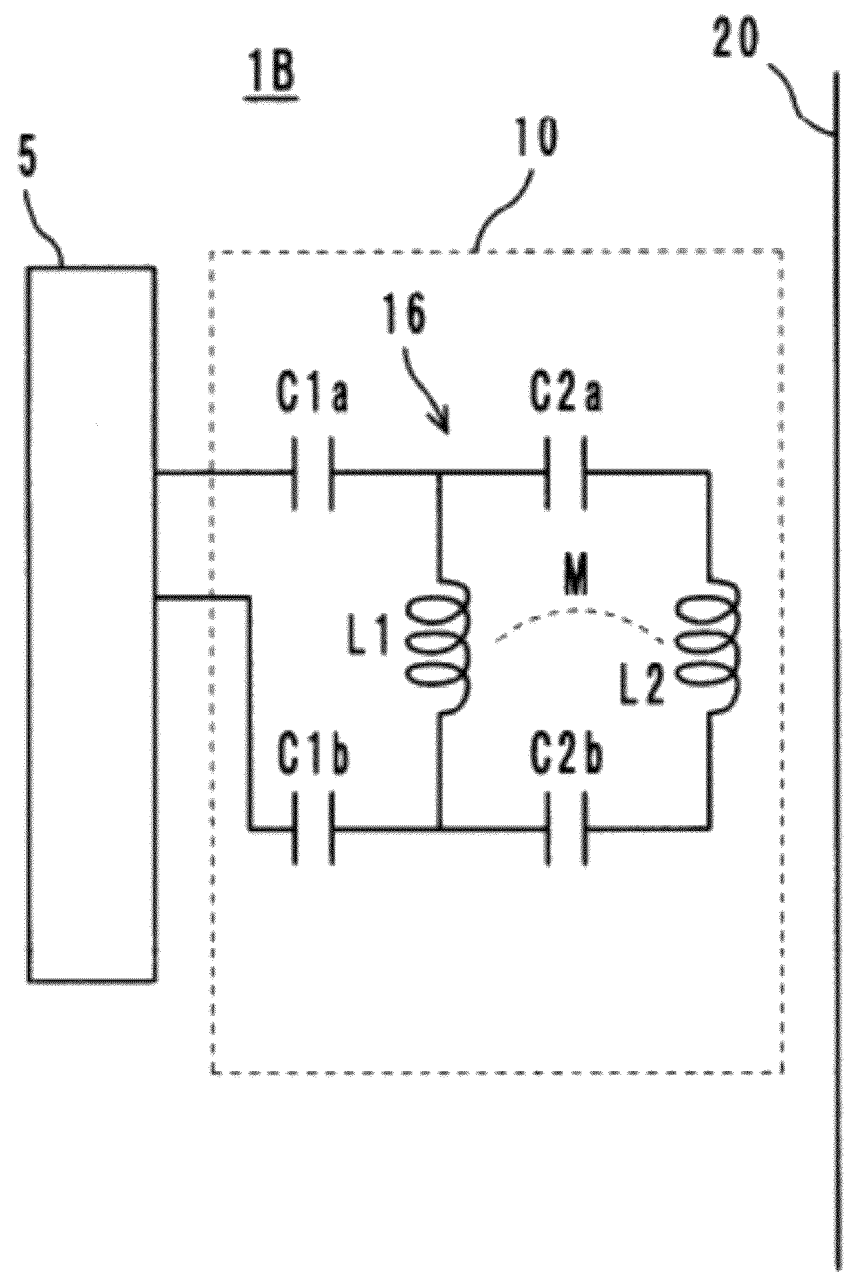
FIG. 3 is an equivalent circuit diagram showing a data coupler according to a second preferred embodiment of the present invention.

A data coupler 1B according to a second preferred embodiment includes an equivalent circuit shown in FIG. 3. In the data coupler 1B, the resonant circuit 16 includes inductance elements L1 and L2 that are magnetically coupled to each other. The inductance element L1 is connected to the modem 5 with capacitance elements C1$a$ and C1$b$ therebetween and is connected substantially in parallel to the inductance element L2 with capacitance elements C2$a$ and C2$b$ therebetween. In other words, the resonant circuit 16 includes an LC series resonant circuit including the inductance element L1 and the capacitance elements C1$a$ and C1$b$, and an LC series resonant circuit including the inductance element L2 and the capacitance elements C2$a$ and C2$b$. The LC series resonant circuits are coupled to each other by magnetic coupling, which is represented by M in FIG. 3. Both of the inductance elements L1 and L2 are magnetically coupled to the electric power line 20.

Figure 4:
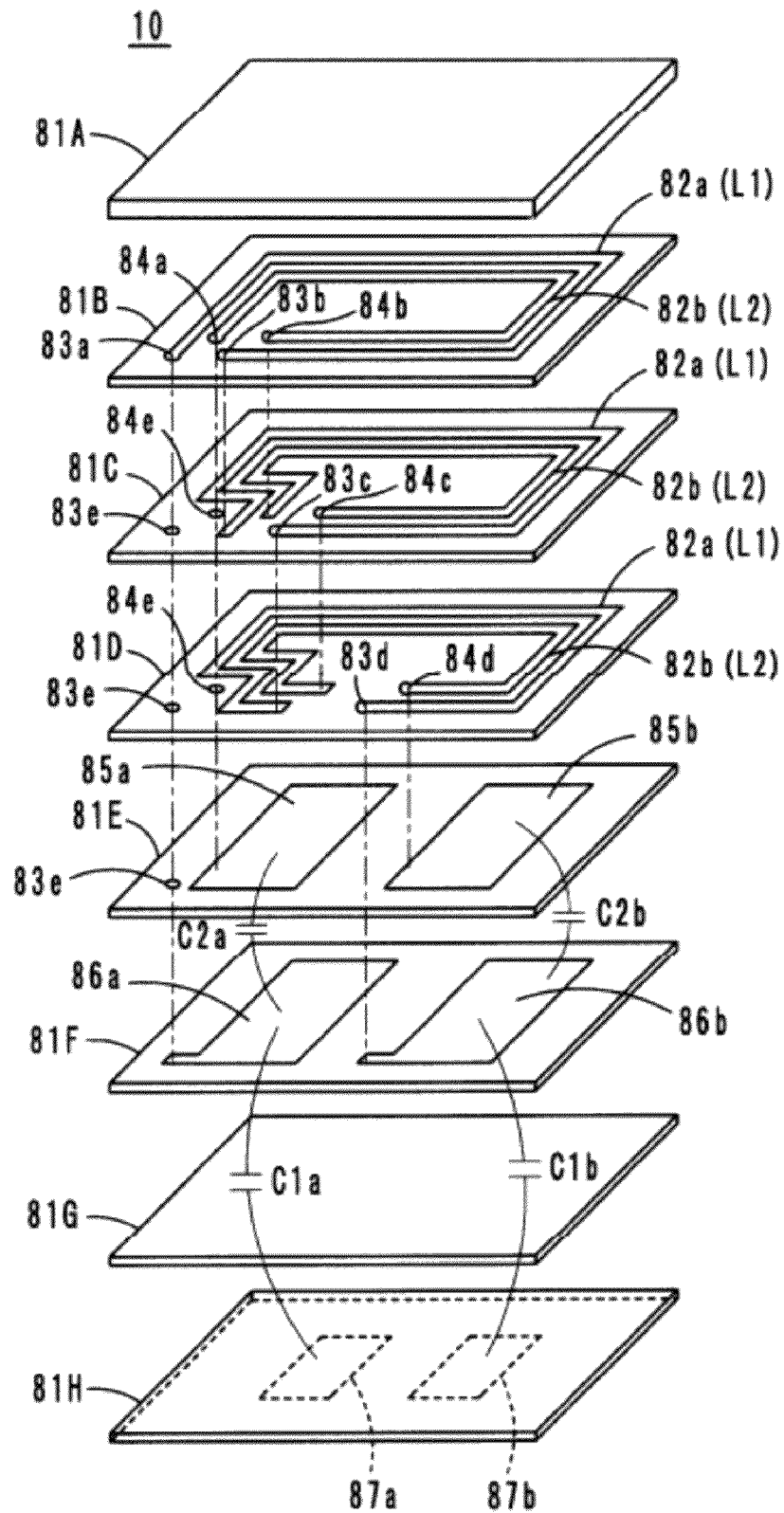
FIG. 4 is an exploded perspective view showing an antenna substrate according to the second preferred embodiment of the present invention.

More specifically, as shown in an exploded perspective view of FIG. 4, the antenna substrate 10 is preferably a laminated body formed by laminating, pressure-bonding, and firing dielectric ceramic sheets 81A to 81H together. The antenna substrate 10 includes a plain sheet 81A; the sheet 81B on which conductor patterns 82$a$ and 82$b$ and via-hole conductors 83$a$, 83$b$, 84$a$, and 84$b$ are formed; the sheet 81C on which conductor patterns 82$a$ and 82$b$ and via-hole conductors 83$c$, 84$c$, 83$e$, and 84$e$ are formed; the sheet 81D on which conductor patterns 82$a$ and 82$b$ and via-hole conductors 83$d$, 84$d$, 83$e$, and 84$e$ are formed; the sheet 81E on which capacitor electrodes 85$a$ and 85$b$ and a via-hole conductor 83$e$ are formed; the sheet 81F on which capacitor electrodes 86$a$ and 86$b$ are formed; the sheet 81G, which is plain; and the sheet 81H on the rear surface of which capacitor electrodes 87$a$ and 87$b$ are formed.

By laminating the sheets 81A to 81H together, the conductor patterns 82$a$ are connected via the via-hole conductors 83$b$ and 83$c$ to define the inductance element L1, and the conductor patterns 82$b$ are connected via the via-hole conductors 84$b$ and 84$c$ to define the inductance element L2. The capacitor electrodes 86$a$ and 87$a$ define the capacitance element C1$a$, and the capacitor electrode 86$a$ is connected via the via-hole conductors 83$e$ to one end of the inductance element L1. The capacitor electrodes 86$b$ and 87$b$ define the capacitance element C1$b$, and the capacitor electrode 86$b$ is connected via the via-hole conductor 83$d$ to the other end of the inductance element L1. In addition, the capacitor electrodes 85*a* and 86*b* define the capacitance element C2*a*, and the capacitor electrode 85*a* is connected via the via-hole conductors 84*e* to one end of the inductance element L2. The capacitor electrodes 85*b* and 86*b* define the capacitance element C2*b*, and the capacitor electrode 85*b* is connected via the via-hole conductor 84*d* to the other end of the inductance element L2.

Operations and advantages achieved in the second preferred embodiment are similar to those achieved in the first preferred embodiment. That is, the data coupler 1B receives a radio-frequency signal (preferably, for example, in a frequency band from 2 MHz to 30 MHz or a UHF frequency band), which is superimposed on the electric power line 20, from the electric power line 20, and causes the resonant circuit 16 (the LC series resonant circuit including the inductance element L1 and the capacitance elements C1*a* and C1*b*, and the LC series resonant circuit including the inductance element L2 and the capacitance elements C2*a* and C2*b*), which is primarily magnetically coupled to the electric power line 20, to resonate, and supplies a reception signal only in a specific frequency band to the modem 5. An output signal from an information device, such as a personal computer (not shown), is input to the resonant circuit 16 via the modem 5. The resonant circuit 16 performs reflection modulation of the output signal to match the frequency of the output signal to a specific frequency. Then, a transmission signal is transmitted from the inductance elements L1 and L2, through magnetic coupling, to the electric power line 20.

Figure 5:
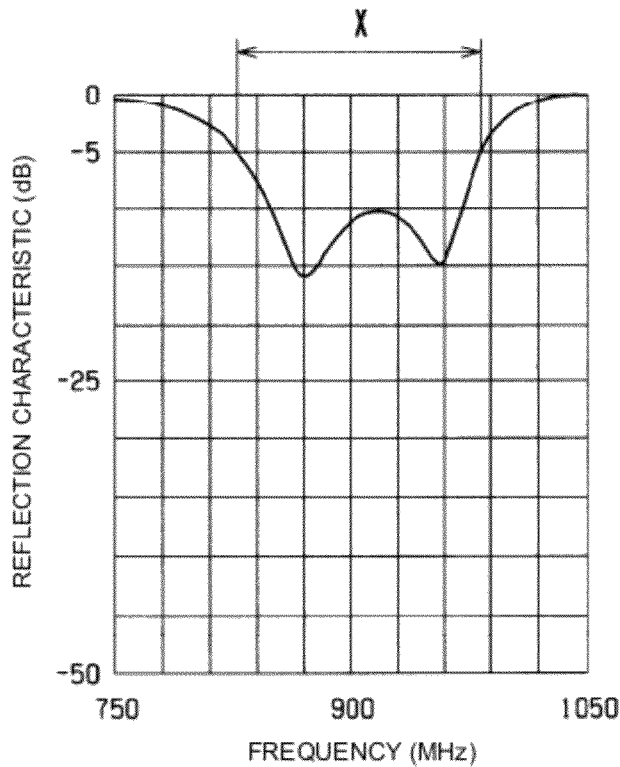
FIG. 5 is a graph showing a reflection characteristic of the second preferred embodiment of the present invention.

In particular, in the second preferred embodiment, as shown in FIG. 5, a very wide frequency band of at least 150 MHz can preferably be achieved at a reflection characteristic of −5 dB, for example. Such a wide frequency band can be achieved because the resonant circuit 16 includes a plurality of LC resonant circuits including the inductance elements L1 and L2 that are magnetically coupled to each other with high degree of coupling. In addition, since the capacitance elements C1*a* and C1*b* are provided at a stage subsequent to the modem 5, a surge withstand capability is significantly improved.

Figure 6:
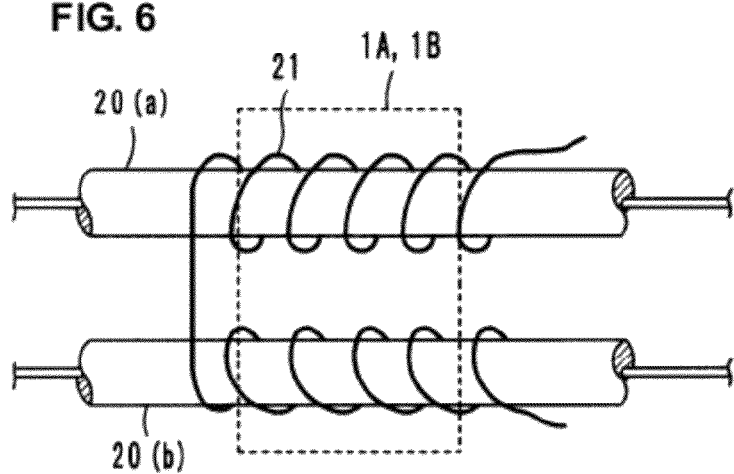
FIG. 6 is a diagram showing a second coupling arrangement in which a data coupler is coupled to an electric power line in a preferred embodiment of the present invention.
Figure 7:
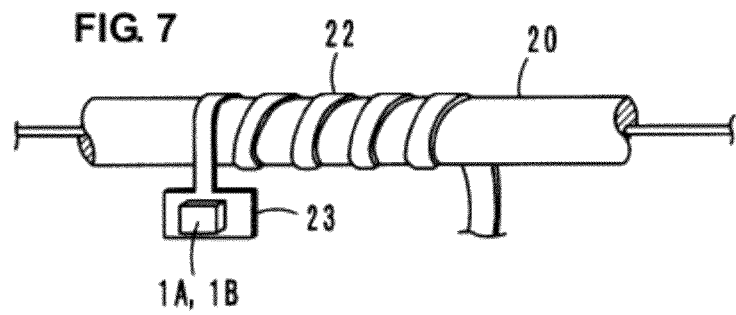
FIG. 7 is a diagram showing a third coupling arrangement in which a data coupler is coupled to an electric power line in another preferred embodiment of the present invention.

Coupling Form between Data Coupler and Electric Power Line, See FIGS. 6 and 7

The coupling arrangement of the data coupler 1A or 1B having the above-described configuration is not necessarily limited to a coupling arrangement in which the data coupler 1A or 1B is simply arranged adjacent to the electric power line 20, as shown in FIGS. 1 and 3 (hereinafter, referred to as a first coupling arrangement). The coupling arrangement of the data coupler 1A or 1B may preferably be a coupling arrangement in which the data coupler 1A or 1B is arranged adjacent to electric power lines 20(*a*) and 20(*b*) or an electric power line 20 with a metal wire 21 or 22 wound around the electric power lines 20(*a*) and 20(*b*) or the electric power line 20 therebetween, as shown in FIGS. 6 and 7.

That is, in a second coupling arrangement shown in FIG. 6, preferably, the metal wire 21 is wound around the electric power line 20(*a*) on a hot side and wound around the electric power line 20(*b*) on a cold side in opposite directions, and the antenna substrate of the data coupler 1A or 1B is arranged adjacent to the metal wire 21. The metal wire 21 that is wound around the electric power lines 20(*a*) and 20(*b*) in opposite directions are magnetically coupled to the resonant circuit in the antenna substrate, and energy is efficiently transmitted between the electric power lines 20(*a*) and 20(*b*) and the resonant circuit. That is, a radio-frequency signal from the resonant circuit in the antenna substrate is transmitted through the metal wire 21 to the electric power lines 20(*a*) and 20(*b*), and a radio-frequency signal superimposed on the electric power lines 20(*a*) and 20(*b*) is transmitted through the metal wire 21 to the resonant circuit in the antenna substrate. Although electromagnetic waves caused by the radio-frequency signal superimposed on the electric power lines 20(*a*) and 20(*b*) are emitted, since the metal wire 21 is wound around the electric power lines 20(*a*) and 20(*b*) in opposite directions, the electromagnetic waves are canceled out due to the opposite phases. Thus, the electromagnetic waves are not radiated.

In the second coupling arrangement, the number of winding turns and the length of the metal wire 21 wound around the electric power line 20(*a*) must be substantially the same as the number of winding turns and the length of the metal wire 21 wound around the electric power line 20(*b*). An electromagnetic wave generated in the metal wire 21 wound around each of the electric power lines 20(*a*) and 20(*b*) is proportional to the square of the number of winding turns of the metal wire 21 and inversely proportional to the length of the metal wire 21. Thus, in order to completely cancel out electromagnetic waves generating in the metal wire 21 wound around the electric power lines 20(*a*) and 20(*b*), the number of winding turns and the length of the metal wire 21 wound around the electric power line 20(*a*) must be substantially the same as the number of winding turns and the length of the metal wire 21 wound around the electric power line 20(*b*). Furthermore, since the metal wire 21 is preferably wound a plurality of turns around each of the electric power lines 20(*a*) and 20(*b*), the efficiency in transmission of a signal to the data coupler 1A or 1B is increased. Thus, the flexibility in the locations of the data coupler 1A or 1B and the electric power lines 20(*a*) and 20(*b*) is increased.

In a third coupling arrangement shown in FIG. 7, the metal wire 22 has a ribbon shape and is wound around the electric power line 20, and the antenna substrate of the data coupler 1A or 1B is attached to an end portion 23 of the metal wire 22 having an increased width. Electric-field coupling is primarily obtained between the metal wire 22 and the resonant circuit in the antenna substrate. A radio-frequency signal is transmitted between the electric power line 20 and the resonant circuit through the metal wire 22.

The present invention is not limited to any one of the data couplers according to the above-described preferred embodiments. Various changes can be made to the preferred embodiments of the present invention within departing from the scope of the present invention.

For example, the details of the internal configuration of an antenna substrate can be designed in any desired manner. The antenna substrate may be made from organic materials, instead of ceramic materials. In addition, various methods and arrangements can be used to connect a modem to the antenna substrate.

As described above, preferred embodiments of the present invention are useful for a data coupler to perform communication using an electric power line. In particular, the preferred embodiments of the present invention are advantageous because the data coupler is small and the data coupler can be easily installed.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A data coupler for coupling data between an electric power line and a communication device, the data coupler comprising:

a metal wire;

an antenna substrate that is not electrically connected in a DC arrangement to the electric power line; wherein the antenna substrate is arranged adjacent to the metal wire;

the metal wire is wound around the electric power line such that ends of the metal wire are not connected to one another; and the antenna substrate includes a resonant circuit including an inductor pattern and a capacitor pattern.

2. The data coupler according to claim 1, wherein the antenna substrate includes at least two resonant circuits.

3. The data coupler according to claim 1, wherein the antenna substrate is arranged adjacent to one of the ends of the metal wire.

4. The data coupler according to claim 1, wherein the metal wire is wound around the electric power line such that winding directions of the metal wire on a hot side and on a cold side of the electric power line are opposite to each other.

5. The data coupler according to claim 1, wherein the communication device is a modem having a data processing function.

* * * * *